(12) United States Patent
Brox et al.

(10) Patent No.: US 11,860,731 B2
(45) Date of Patent: *Jan. 2, 2024

(54) CHANNEL MODULATION FOR A MEMORY DEVICE

(71) Applicant: Lodestar Licensing Group LLC, Evanston, IL (US)

(72) Inventors: Martin Brox, Munich (DE); Peter Mayer, Neubiberg (DE); Wolfgang Anton Spirkl, Germering (DE); Thomas Hein, Munich (DE); Michael Dieter Richter, Ottobrunn (DE); Timothy M. Hollis, Meridian, ID (US); Roy E. Greeff, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,700

(22) Filed: Jul. 5, 2022

(65) Prior Publication Data

US 2022/0334915 A1 Oct. 20, 2022

Related U.S. Application Data

(63) Continuation of application No. 16/744,025, filed on Jan. 15, 2020, now Pat. No. 11,409,595.

(Continued)

(51) Int. Cl.
*G06F 11/00* (2006.01)
*G06F 11/10* (2006.01)
(Continued)

(52) U.S. Cl.
CPC .......... *G06F 11/1004* (2013.01); *G06F 11/16* (2013.01); *G06F 12/02* (2013.01)

(58) Field of Classification Search
CPC ....... G06F 11/1004; G06F 11/16; G06F 12/02
See application file for complete search history.

(56) References Cited

U.S. PATENT DOCUMENTS 9,734,898 B2 8/2017 Seol et al.
9,870,834 B2 1/2018 Li et al.
(Continued)

OTHER PUBLICATIONS

European Patent Office, "Supplementary European search report and Search Opinion", issued in connection with European Patent Application No. 20740951 dated Mar. 28, 2022 (7 pages).

(Continued)

*Primary Examiner* — Christine T. Tu
(74) *Attorney, Agent, or Firm* — Holland & Hart LLP

(57) ABSTRACT

Methods, systems, and devices for channel modulation for a memory device are described. A system may include a memory device and a host device coupled with the memory device. The system may be configured to communicate a first signal modulated using a first modulation scheme and communicate a second signal that is based on the first signal and that is modulated using a second modulation scheme. The first modulation scheme may include a first quantity of voltage levels that span a first range of voltages, and the second modulation scheme may include a second quantity of voltage levels that span a second range of voltages different than (e.g., smaller than) the first range of voltages. The first signal may include write data carried over a data channel, and the second signal may include error detection information based on the write data that is carried over an error detection channel.

20 Claims, 8 Drawing Sheets

Related U.S. Application Data

(60) Provisional application No. 62/793,585, filed on Jan. 17, 2019.

(51) Int. Cl.
*G06F 11/16* (2006.01)
*G06F 12/02* (2006.01)

(56) References Cited

U.S. PATENT DOCUMENTS

| | | |
|---|---|---|
| 10,128,842 B1 | 11/2018 | Lin |
| 2006/0140287 A1 | 6/2006 | Alon et al. |
| 2010/0297949 A1 | 11/2010 | Nakajima |
| 2013/0023298 A1* | 1/2013 | Chen .................. H04W 52/241 |
| | | 455/522 |
| 2014/0082455 A1 | 3/2014 | Yosoku et al. |
| 2014/0362786 A1* | 12/2014 | Kelman ............... H04B 17/318 |
| | | 370/329 |
| 2015/0085914 A1 | 3/2015 | Kizer et al. |
| 2015/0193321 A1 | 7/2015 | Ngo et al. |
| 2016/0004597 A1 | 1/2016 | Tsern et al. |
| 2019/0103143 A1 | 4/2019 | Hasbun et al. |

OTHER PUBLICATIONS

International Search Report and Written Opinion received for PCT Patent Application No. PCT/US20/13818, dated May 13, 2020, 9 pages.

* cited by examiner

CHANNEL MODULATION FOR A MEMORY DEVICE

CROSS REFERENCE

The present Application for Patent is a continuation of U.S. patent application Ser. No. 16/744,025 by Brox et al., entitled "CHANNEL MODULATION FOR A MEMORY DEVICE," filed Jan. 15, 2020, which claims the benefit of U.S. Provisional Patent Application No. 62/793,585 by Brox et al., entitled "CHANNEL MODULATION FOR A MEMORY DEVICE," filed Jan. 17, 2019, each of which is assigned to the assignee hereof, and each of which is expressly incorporated by reference in its entirety herein.

BACKGROUND

The following relates generally to a system that includes at least one memory device and more specifically to channel modulation for a memory device.

Memory devices are widely used to store information in various electronic devices such as computers, wireless communication devices, cameras, digital displays, and others. Information is stored by programming different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

In some systems, signals transmitted by a memory device (e.g., to a host device) may cause interference, which may affect signals that the memory device is meant to receive (e.g., from a host device). Thus, signal transmission at a memory device may affect signal reception at the memory device, which may impact various operations performed with the memory device.

DETAILED DESCRIPTION

Figure 1:
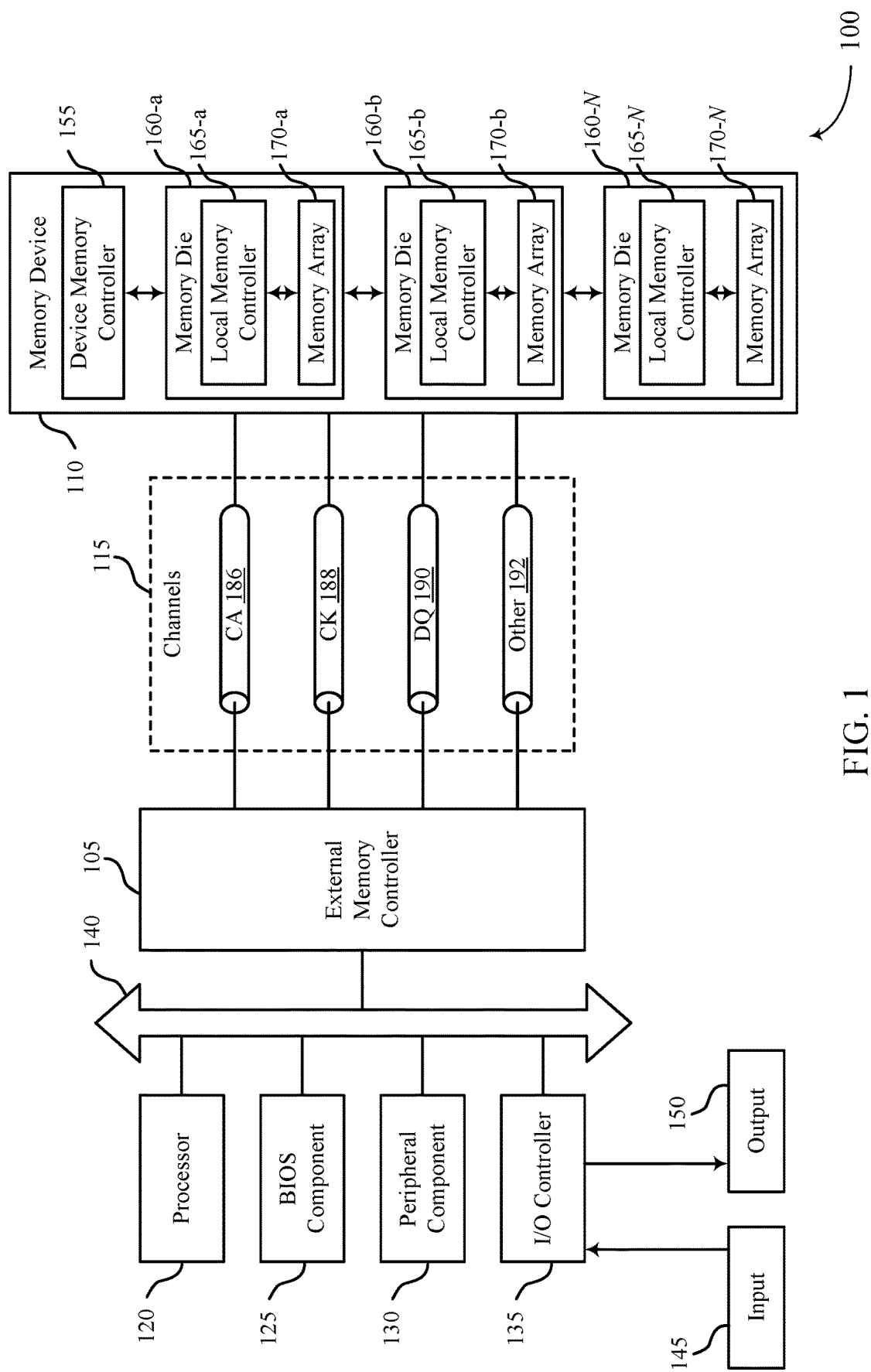
FIG. 1 illustrates an example of a system that supports channel modulation for a memory device in accordance with examples as disclosed herein.

In some systems that include a memory device and a host device (e.g., a device that uses the memory device to store information), signals transmitted by the memory device may cause interference (e.g., radio frequency (RF) interference, electromagnetic (EM) interference, electric field interference) with signals that the memory device is meant to receive (e.g., from a host device). In some cases, the signals transmitted by the memory device may affect components that are configured to receive such signals. Thus, signal transmission by a memory device may affect signal reception at the memory device, which may impact various operations performed with the memory device. In some cases, signals received by the memory device may affect signals transmitted by the memory device as well.

In accordance with examples as disclosed herein, a memory system may be configured to transmit signals in a manner to reduce interference with other signals. For example, a memory device may transmit a signal that has been modulated to have a smaller voltage swing than the signal being received by the memory device and thereby reduce the interference between the signals. The memory system may communicate, from a host device to a memory device, first signaling that is modulated using a first modulation scheme that spans a first range of voltages. In some examples, the first signaling may include or refer to data signaling, and the first signaling may include signaling over a data channel (e.g., a write signal). The first modulation scheme may include a first quantity of voltage levels (e.g., four (4) voltage levels). The system may also be configured to communicate, from the memory device to the host device, second signaling that is based at least in part on the first signaling. The second signaling may be modulated using a second modulation scheme that spans a second range of voltages that is smaller than the first range of voltages. In some examples, the second signaling may include or refer to error detection signaling, and the second signaling may include signaling over an error detection channel (e.g., an error detection signal or some other channel). The second modulation scheme may include a second quantity of voltage levels. In some examples, the second quantity of voltages may be fewer than the first quantity of voltages (e.g., two (2) voltage signals), and, in some examples, the voltage levels of the second modulation scheme may be a subset of the voltage levels of the first modulation scheme. Using the techniques described herein, interference of the second signaling on the first signaling may be reduced relative to other techniques, which may improve performance of the described memory systems.

Features of the disclosure are initially described in the context of a memory system and memory die as described with reference to FIGS. 1 and 2. Features of the disclosure are described in the context of diagrams and illustrative modulation schemes as described with reference to FIGS. 3 and 4. These and other features of the disclosure are further illustrated by and described with reference to apparatus diagrams and flowcharts that relate to channel modulation for a memory device as described with references to FIGS. 5 through 8.

FIG. 1 illustrates an example of a system 100 that utilizes one or more memory devices in accordance with examples as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, a graphics processing device, a vehicle, and others. The system 100 may be an example of a portable electronic device. The system 100 may be an example of a computer, a laptop computer, a tablet computer, a smartphone, a cellular phone, a wearable device, an internet-connected device, a vehicle, or others. The memory device 110 may be component of the system configured to store data for one or more other components of the system 100.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, a vehicle, or others. In some cases, the host device may refer to the hardware, firmware, software, or a combination thereof that implements the functions of the external memory controller 105. In some cases, the external memory controller 105 may be referred to as a host or host device.

In some cases, a memory device 110 may be an independent device or component that is configured to be in communication with other components of the system 100 and provide physical memory addresses or other space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose graphics processing unit (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, gates, decoders, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another or next to one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or others.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may, in some cases, be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be x4 (e.g., including four signal paths), x8 (e.g., including eight signal paths), x16 (including sixteen signal paths), and so forth. Signals communicated over the channels may use a double data rate (DDR) timing scheme. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include any quantity of signal paths to decode address and command data (e.g., eight or nine signal paths).

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110. The data channels 190 may communicate signals that may be modulated using a variety of different modulation schemes (e.g., e.g., non-return-to-zero (NRZ), pulse amplitude modulation (PAM) having some quantity of symbols or voltage levels, such as a PAM4 scheme associated with four symbols or voltage levels).

In some cases, the channels 115 may include one or more other channels 192 that may be dedicated to other purposes. These other channels 192 may include any quantity of signal paths.

In some cases, the other channels 192 may include one or more write clock signal (WCK) channels. While the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may include one or more error detection code (EDC) channels. The EDC channels may be configured to communicate error detection signals, such as checksums, to improve system reliability. An EDC channel may include any quantity of signal paths, and may communicate signals that are modulated using a modulation scheme (e.g., PAM having some quantity of symbols or voltage levels).

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, NRZ, unipolar encoding, bipolar encoding, Manchester encoding, PAM having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., where a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal or a PAM4 signal may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

In some examples, signaling transmitted by the memory device 110 (e.g., over channels 115, to a host device) may cause interference, such as radio frequency (RF) interference, electromagnetic (EM) interference, electric field interference, or others. In some examples, interference caused by transmitted signaling may be related to the level or rate of change of current associated with the transmitted signaling, related to the level or rate of change of voltage associated with the transmitted signaling, or various combinations thereof. For example, a relatively faster rate of change of current or voltage of a transmitted signal may be associated with a relatively stronger or faster change in electric or electromagnetic field associated with the transmitted signal, whereas a relatively slower rate of change of current or voltage of a transmitted signal may be associated with a relatively weaker or slower change in electric or electromagnetic field associated with the transmitted signal. The transmitted signaling may be referred to as an aggressor or aggressor signal, and interference may be based at least in part on a level of the aggressor, the rate of change of the aggressor, and other phenomena.

In some systems, the interference from transmitted signaling may be incident on a signal-carrying path (e.g., a channel 115, a conductive path of the memory device 110 or a host device, a conductive path between a host device and the memory device 110) or a component that is part of a signal-carrying path for a signal that is to be received (e.g., a component of the memory device 110 or a host device, a component between a host device and the memory device 110). For example, an electric or electromagnetic field caused by signaling transmitted by the memory device 110, which may be an oscillating or otherwise changing electric or electromagnetic field, may be incident on a channel 115 that is associated with a signal that is to be received by the memory device 110. In some examples, a channel 115 associated with receiving a signal (e.g., for reception the memory device 110) may have a capacitive or inductive link or coupling with an aggressor, such as a capacitive or inductive link or coupling with another channel 115, a component of the memory device 110 (e.g., a transmitter), a component of a host device, or various combinations thereof. In one example, incident electric or electromagnetic field caused by transmitted signaling may change or disrupt a signal that is to be received (e.g., change or disrupt a current or voltage on the conductive path), or affect components that are configured to receive the signal, which may be referred to as "cross-talk" (e.g., AC cross-talk, capacitive cross-talk) In some examples, such cross-talk may affect (e.g., impair, prevent) the ability of the memory device 110 to concurrently transmit and receive signals.

In accordance with examples as disclosed herein, the system 100 may be configured to communicate, from a host device to the memory device 110 (e.g., over a first channel 115), first signaling that is modulated using a first modulation scheme that spans a first range of voltages. In some examples, the first signaling may include or refer to data signaling over a data channel (e.g., a write signal, which may be carried on channel that is configured for data, such as a DQ channel), and the first modulation scheme may include a first quantity of voltage levels. The system may also be configured to communicate, from the memory device 110 to the host device (e.g., over a second channel 115), second signaling that is based at least in part on the first signaling. The second signaling may be modulated using a second modulation scheme that spans a second range of voltages that is smaller than the first range of voltages. In some examples, the second signaling may include or refer to error detection signaling over an error detection channel (e.g., error detection information, which may be carried on a channel that is configured for error detection and correction information, such as an EDC channel), or some other channel, and the second modulation scheme may include a second quantity of voltage levels. In some examples, the second quantity of voltages may be fewer than the first quantity of voltages, such as a subset of the first quantity of levels.

Using the techniques described herein, interference of the second signaling on the first signaling may be reduced relative to other techniques. For example, by reducing a span of voltages for transmitted signaling, a rate of change associated with the signaling (e.g., a rate of change of voltage or current associated with the transmitted signaling) may be reduced, which may reduce electromagnetic fields, electric fields, or other forms of interference induced by the transmitted signaling. Thus, signal paths associated with received signaling may be exposed to reduced interference, which may improve a device's ability to simultaneously transmit and receive signaling. Accordingly, by reducing a span of voltages for transmitted signaling, communication between a memory device 110 and a host device may be improved, which may improve performance of the memory system 100.

Figure 2:
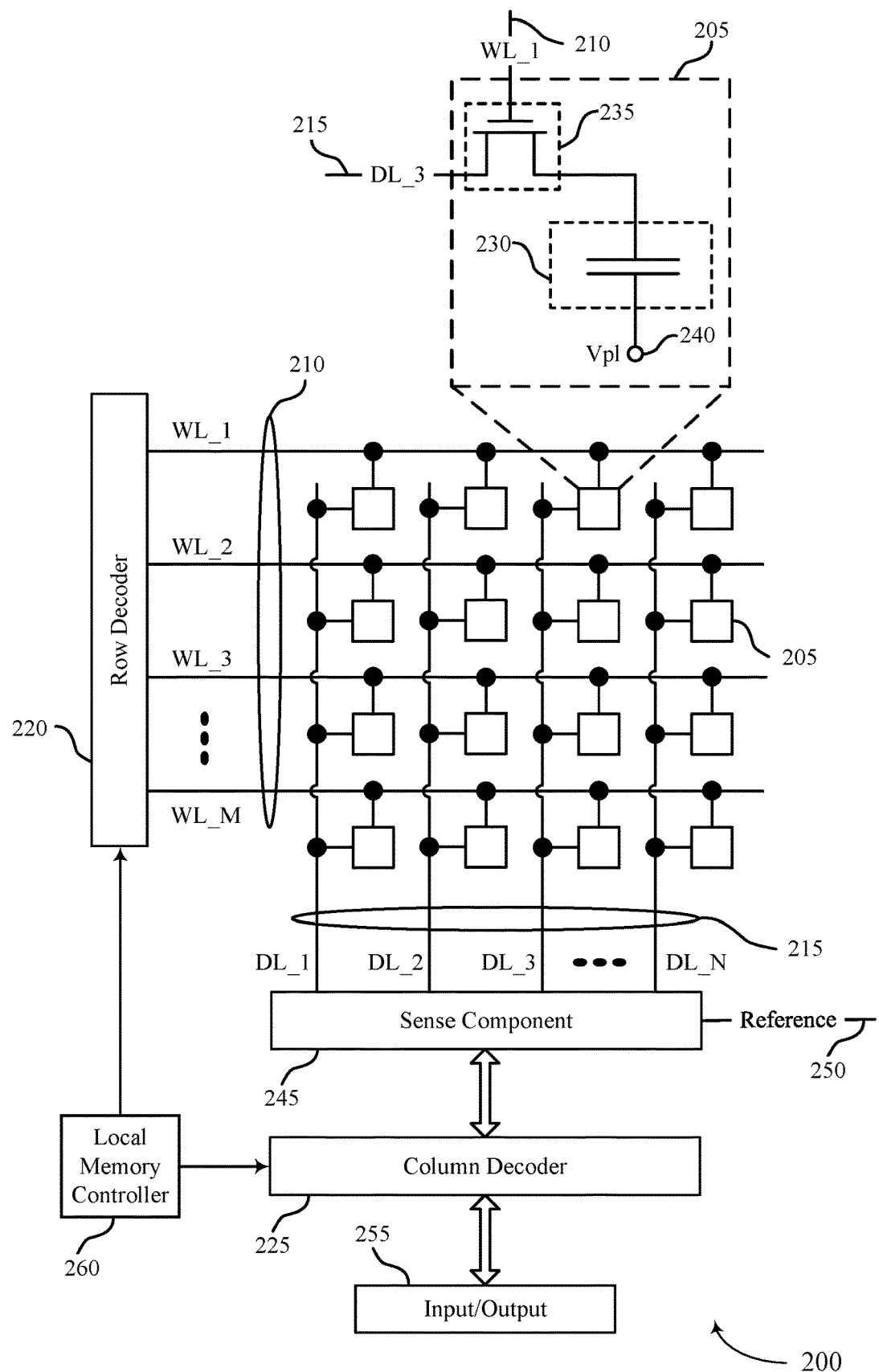
FIG. 2 illustrates an example of a memory die that supports channel modulation for a memory device in accordance with examples as disclosed herein.

FIG. 2 illustrates an example of a memory die 200 in accordance with examples as disclosed herein. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals. The detected logic state of memory cell 205 may be output through column decoder 225 as output 255. In some cases, the sense component 245 may be part of another component (e.g., a column decoder 225, row decoder 220). In some cases, the sense component 245 may be in electronic communication with the row decoder 220 or the column decoder 225.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

Figure 3:
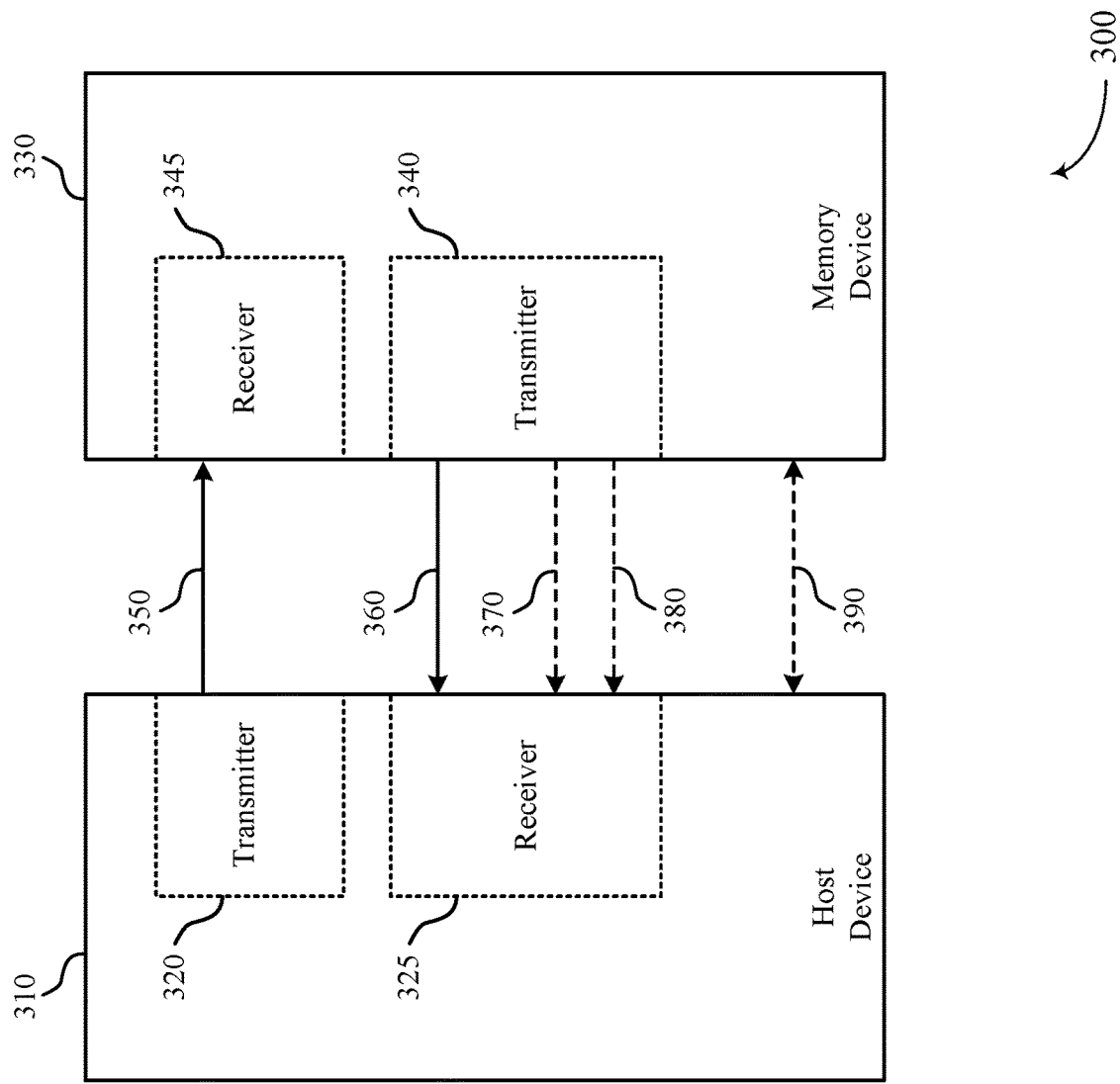
FIG. 3 illustrates an example of a system that supports channel modulation for a memory device in accordance with examples as disclosed herein.

FIG. 3 illustrates an example of a system 300 that supports channel modulation for a memory device in accordance with examples as disclosed herein. The system 300 may include a host device 310 and a memory device 330, and may be configured to support signaling over channels between the host device 310 and the memory device 330 (e.g., channels 115 described with reference to FIG. 1).

The host device 310 may include a transmitter 320 and a receiver 325. In some examples, the transmitter 320 and the receiver 325 may be part of a transceiver component of the host device 310. Although illustrated as including a single transmitter 320, in some examples, a host device 310 may include a transmitter 320 for each channel of a set of channels, for each pin of a set of pins (e.g., of a set of pins associated with a channel), or various other configurations. Likewise, although illustrated as including a single receiver 325, in some examples, a host device 310 may include a receiver 325 for each channel of a set of channels, for each pin of a set of pins (e.g., of a set of pins associated with a channel), or various other configurations. In some examples, a transmitter 320 and a receiver 325 may be included in a channel-specific transceiver, such as a transceiver configured to communicate signaling over a bidirectional data channel (e.g., a DQ channel), or some other channel, having one or more transmission paths (e.g., one or more pins, one or more conductors).

The memory device 330 may include a transmitter 340 and a receiver 345. In some examples, the transmitter 340 and the receiver 345 may be part of a transceiver of the memory device 330. Although illustrated as including a single transmitter 340, in some examples, a memory device 330 may include a transmitter 340 for each channel of a set of channels, for each pin of a set of pins (e.g., of a set of pins associated with a channel), or various other configurations. Likewise, although illustrated as including a single receiver 345, in some examples, a memory device 330 may include a receiver 345 for each channel of a set of channels, for each pin of a set of pins (e.g., of a set of pins associated with a channel), or various other configurations. In some examples, a transmitter 340 and a receiver 345 may be included in a channel-specific transceiver, such as a transceiver configured to communicate over a bidirectional channel such as a data channel (e.g., a DQ channel) having one or more transmission paths (e.g., one or more pins, one or more conductors). In another example, the transmitter 340 or the receiver 345 may be part of a transceiver configured to communicate data over an error detection channel.

The system 300 may be configured to communicate first signaling 350 and second signaling 360. In some examples, the second signaling 360 may be based at least in part on the first signaling 350 (e.g., responsive to the first signaling 350, determined based on a calculation or other operation using information carried in the first signaling 350). For example, the first signaling 350 may include or refer to data signaling (e.g., write data, a write signal) over a channel that is configured for data (e.g., a DQ channel), and the second signaling 360 may include or refer to error detection signaling (e.g., error detection information, a checksum, an error detection signal) over a channel that is configured for error detection and correction information (e.g., an EDC channel) or some other channel. In some examples, the first signaling 350 and the second signaling 360 may be associated with a different quantity of signal paths. For example, the first signaling 350 may be carried on an 8-line data channel and the second signaling 360 may be carried on a 1-line error detection channel.

The memory device 330 may perform various operations to support error detection (e.g., detecting errors of communication between the host device 310 and the memory device 330, detecting errors in access operations with the memory device 330). For example, when the first signaling 350 includes write data, the memory device 330 may calculate a checksum or other condensed version of the write data. A checksum of the write data, for example, may be sent to the host device 310 via the second signaling 360. The host device 310 may also calculate a checksum of the write data, and may compare the calculated value with the received value to detect whether the memory device 330 properly received or wrote the data, or whether various error recovery operations should be performed.

Although described in the context of an error detection scheme having a comparison performed by a host device 310, the described techniques performed at one of the host device 310 or the memory device 330 may, in some examples, be performed at the other of the host device 310 or the memory device 330 (e.g., when the memory device 330 performs a comparison of a calculated checksum with a checksum received from the host device 310). Moreover, although described in the context of write data and responsive error detection data, the first signaling 350 and the second signaling 360 may refer to other signaling exchanged between the host device 310 and the memory device 330, which may or may not be associated with responsive communications. For example, the memory device 330 may generate checksums for read data transmitted to the host device, command/address data received from the host device, or combinations thereof.

In the example of system 300, the first signaling 350 and the second signaling 360 may illustrate an asymmetry of signal strength, which may be related to an attenuation environment between the host device 310 and the memory device 330. For example, the first signaling 350 may be relatively strong at the transmitter 320 and relatively weak at the receiver 345 (e.g., due to attenuation from the host device 310 to the memory device 330). On the other hand, the second signaling 360 may be relatively strong at the transmitter 340 and relatively weak at the receiver 325 (e.g., due to attenuation from the memory device 330 to the host device 310). Thus, from the perspective of the memory device 330, the relatively strong second signaling 360 compared with the relatively weak first signaling 350 may illustrate a signal strength asymmetry, which, in some examples, may be associated with the first signaling 350 being susceptible to interference (e.g., from the second signaling 360).

Asymmetry in signal strength may cause one signal to be an aggressor signal and another signal to be a victim signal. For example, second signaling 360 may cause interference, such as radio frequency (RF) interference, electromagnetic (EM) interference, electric field interference, or others on the first signaling 350. In some examples, interference caused by the second signaling 360 may be related to the level or rate of change of current associated with the transmitted signaling, related to the level or rate of change of voltage associated with the transmitted signaling, other phenomena, or various combinations thereof. For example, a relatively faster rate of change of current or voltage of the second signaling 360 may be associated with a relatively stronger or faster change in electric or electromagnetic field, whereas a relatively slower rate of change of current or voltage of the second signaling 360 may be associated with a relatively weaker or slower change in electric or electromagnetic field associated with the transmitted signal.

Interference from the second signaling 360 may be experienced on a signal-carrying path (e.g., a channel 115, a conductive path of the memory device 110 or a host device, a conductive path between a host device and the memory device 110) associated with the first signaling 350, or a component that is part of a signal-carrying path for the first signaling 350 (e.g., the receiver 345, the transmitter 320). For example, an electric or electromagnetic field caused by the second signaling 360, which may be an oscillating or otherwise changing electric or electromagnetic field, may be incident on a channel configured to carry the first signaling 350. In some examples, the incidence or susceptibility of such interference may be associated with a capacitive coupling or an inductive coupling, which may be related to geometry or layout of various components of the system 300. An incident electric or electromagnetic field caused by the second signaling 360 may change or disrupt the first signaling 350 (e.g., change or disrupt a current or voltage on the conductive path), or affect components that are configured to receive the signal (e.g., the receiver 345). In some examples, such cross-talk may affect (e.g., impair, prevent) the ability of the memory device 330 to concurrently transmit and receive signals.

The system 300 may be configured to communicate the first signaling 350 using a first modulation scheme that spans a first range of voltages, and communicate the second signaling 360 using a second modulation scheme that spans a second range of voltages. In some cases, the second range of voltages is smaller than the first range of voltages. In some examples, by using the second modulation scheme for the second signaling 360 that spans a relatively smaller range of voltages, the interference of the second signaling 360 (e.g., on the first signaling 350) may be reduced when compared to a relatively larger range of voltages. For example, interference of the second signaling 360 may be associated with a rate of change of voltage of the second signaling 360, which may be based at least in part on a switching frequency, a modulation rate, or other time interval of the second modulation scheme for changing from one voltage level to another voltage level, and a maximum difference between a highest voltage level and a lowest voltage level of the second modulation scheme. Thus, interference from the second signaling 360 may be reduced by bringing a highest voltage level and a lowest voltage level closer together in voltage for the second modulation scheme (e.g., as compared with the first modulation scheme).

In some examples, the first modulation scheme associated with the first signaling 350 may refer to a modulation according to a first quantity of levels (e.g., voltage levels). Thus, the transmitter 320 may include or otherwise refer to a modulator that is configured to process received information (e.g., received from another component of the host device 310) and, based on the processed information, output the first signaling 350 at various voltages of the first quantity of levels. Accordingly, the receiver 345 may include or otherwise refer to a demodulator that is configured to receive the first signaling 350, and decode the associated information according to the first quantity of levels of the first modulation scheme. In various examples, the quantity of levels for the first modulation scheme, or particular voltage levels thereof, may be designed (e.g., as fixed parameters or characteristics) or dynamically configured (e.g., based on communicated signaling, event-driven) at such a modulator (e.g., of the transmitter 320) or demodulator (e.g., of the receiver 345).

In some examples, the second modulation scheme associated with the second signaling 360 may refer to a modulation according to a second quantity of levels (e.g., voltage levels). Thus, the transmitter 340 may include or otherwise refer to a modulator that is configured to process received information (e.g., received from another component of the memory device 330) and output, based on the processed information, the second signaling 360 at various voltages of the second quantity of levels. Accordingly, the receiver 325 may include or otherwise refer to a demodulator that is configured to receive the second signaling 360, and decode the associated information according to the first quantity of levels of the first modulation scheme. In various examples, the quantity of levels for the second modulation scheme, or particular voltage levels thereof, may be designed (e.g., as fixed parameters or characteristics) or dynamically configured (e.g., based on communicated signaling, event-driven) at such a modulator (e.g., of the transmitter 340) or demodulator (e.g., of the receiver 325).

In various examples, the first quantity of levels and the second quantity of levels may be different. For example, the quantity of voltage levels of the second modulation scheme may be fewer than the quantity of voltage levels of the first modulation scheme. In some examples, the levels of the second modulation scheme may be a subset of the levels of the first modulation scheme. For example, when the first modulation scheme includes a set of voltage levels $\{V_1, V_2, V_3, \text{ and } V_4\}$, the second modulation scheme may include a set of levels $\{V_1, V_2, \text{ and } V_3\}$, a set of levels $\{V_2, V_3, \text{ and } V_4\}$, a set of levels $\{V_1, V_3, \text{ and } V_4\}$, a set of voltage levels $\{V_1 \text{ and } V_2\}$, a set of voltage levels $\{V_1 \text{ and } V_3\}$, a set of voltage levels $\{V_1 \text{ and } V_4\}$, a set of voltage levels $\{V_2 \text{ and } V_3\}$, a set of voltage levels $\{V_2 \text{ and } V_4\}$, a set of voltage levels $\{V_3 \text{ and } V_4\}$, or others. In some examples, such as when the second modulation scheme includes fewer voltage levels than the first modulation scheme, the rate of information carried by the second signaling 360 may be lower than the rate of information carried by the first signaling 350 (e.g., per signal carrying path).

In some examples, a voltage level of the first modulation scheme and the second modulation scheme may be shared based on a particular termination scheme of the system 300 (e.g., of the host device 310 or the memory device 330). For example, $V_1$ may be common to the first modulation scheme and the second modulation scheme when $V_1$ is a termination voltage level associated with the system 300, which may reduce power consumption in the system 300 (e.g., due to DC currents associated with the termination voltage). In some examples, the quantity of voltage levels may be associated with a particular modulation architecture, where a PAM4 modulation scheme would include 4 voltage levels, and a PAM2 modulation scheme would include 2 voltage levels, and so on. In some digital systems, it may be advantageous for the quantity of voltage levels of a modulation scheme be a power of 2 (e.g., 2 levels, 4 levels, 8 levels, 16 levels, and so on), but different quantities of voltage levels may be used to support the techniques described herein.

In some examples, the first quantity of levels and the second quantity of levels may be the same, but may span different (e.g., larger or smaller) voltage ranges. For example, the first modulation scheme may include a set of voltage levels $\{V_1, V_2, V_3, \text{ and } V_4\}$ (e.g., in ascending order of voltage) and the second modulation scheme may include a set of levels $\{V_5, V_6, V_7, \text{ and } V_8\}$ (e.g., in ascending order of voltage). The span of voltage between $V_8$ and $V_5$ (e.g., $V_8-V_5$) may be smaller than the span of voltage between $V_4$ and $V_1$ (e.g., $V_4-V_1$). Thus, the second modulation scheme may be associated with a reduction in interference (e.g., in comparison with the first modulation scheme), and the system 300 may be designed such that the receiver 325 can resolve the narrower differences between voltage levels of the second signaling 360.

In various examples, the span of voltage levels of the first modulation scheme and the span of voltage levels of the second modulation scheme may or may not overlap. For example, various scenarios can be considered where the first modulation scheme includes a set of voltage levels $\{V_a, \ldots V_b\}$ (e.g., in ascending order), which may be a set of any quantity of voltage levels, and where the second modulation scheme includes a set of voltages $\{V_c, \ldots V_d\}$ (e.g., in ascending order), which may be a set of any quantity of voltage levels. In some examples, for reducing interference from the second signaling 360, the span $(V_d-V_c)$ may be less than the span $(V_b-V_a)$. For examples where the spans of voltage levels are non-overlapping, both $V_c$ and $V_d$ may be less than $V_a$, or both $V_c$ and $V_d$ may be greater than $V_b$. For examples where the spans of voltage levels are partially overlapping, $V_c$ may be less than $V_a$ and $V_d$ may be between $V_a$ and $V_b$, or $V_c$ may be between $V_a$ and $V_b$ and $V_d$ may be greater than $V_a$. For examples where the spans of voltages are entirely overlapping (e.g., with respect to the smaller of the voltage ranges), both $V_c$ and $V_d$ may be between $V_a$ and $V_b$, or $V_c$ may equal $V_a$ and $V_d$ may be between $V_a$ and $V_b$, or $V_c$ may be between $V_a$ and $V_b$ and $V_d$ may be equal to $V_b$.

The selection of a modulation scheme for the first signaling 350 or the second signaling 360, or configuration of different aspects of a modulation scheme for the first signaling 350 or the second signaling 360 (e.g., quantities of voltage levels, particular voltage levels), may be performed in the system 300 in various manners. For example, aspects of the first modulation scheme and the second modulation scheme may be preconfigured in a system based on fixed hardware design (e.g., special-purpose hardware), selectable parameters (e.g., as stored in non-volatile storage of the memory device 330 or the host device 310, a mode register of the memory device or the host device 310, as stored in a fuse or other one-time programmable storage of the memory device 330 or the host device 310), or various combinations thereof.

In some examples, aspects of the first modulation scheme and the second modulation scheme may be dynamically configured. For example, the host device 310, the memory device 330, or both may perform various operations, detections, or determinations to dynamically configure the first modulation scheme or the second modulation scheme. In some examples, one of the host device 310 or the memory device 330 may perform such operations, detections, or determinations, and signal (e.g., via signaling 390) a result, an operating mode, or a configuration to the other of the host device 310 or the memory device 330.

In some examples, such operations, detections, or determinations may be performed based at least on a communication or exchange of signaling between the host device 310 and the memory device 330. For example, the host device 310 and the memory device 330 may perform a training sequence that includes a set of write operations and a set of error detection operations, and one or more modulation schemes may be selected or configured based on a result of the training sequence. In various examples, such a training sequence can be performed in a device qualification (e.g., in a manufacturing or assembly operation of the memory device 330, of the host device 310, or of the system 300 as a whole), in an initialization sequence (e.g., upon powering the memory device 330 or the host device), or in an event-driven sequence (e.g., upon detecting an operating condition). In some examples, a result of such a training sequence, or some other operation based on communicated signaling between the host device 310 and the memory device 330, may be stored in non-volatile storage of the host device 310 or the memory device 330, which may include storage in a one-time programmable storage element (e.g., a fuse).

In some examples, the system 300 may also be configured to communicate third signaling 370 and fourth signaling 380. In some examples, the fourth signaling 380 may be based at least in part on the third signaling 370 (e.g., responsive to the third signaling 370, determined based on a calculation or other operation using information carried in the third signaling 370). For example, the third signaling 370 may include or refer to data signaling (e.g., read data, a read signal) over a channel that is configured for data (e.g., a DQ channel), and the fourth signaling 380 may include or refer to error detection signaling (e.g., read operation error detection information, a checksum, an error detection signal) over a channel configured for error detection and correction information (e.g., an EDC channel).

Although illustrated separately, the third signaling 370 and the first signaling 350 may be carried on a common channel (e.g., a bidirectional data channel), such as when the receiver 345 and the transmitter 340 are part of a transceiver of the memory device 330 or when the transmitter 320 and the receiver 325 are part of a transceiver of the host device 310. Further, although illustrated separately, the fourth signaling 380 and the second signaling 360 may be carried on a common channel (e.g., a unidirectional error detection channel), such as when the host device 310 performs error detection comparisons for both read operations and write operations.

The system 300 may be configured to communicate the third signaling 370 using a third modulation scheme, which may be the same as or different than the first modulation scheme (e.g., associated with the first signaling 350). For example, when carried on a bidirectional data channel, the first signaling 350 and the third signaling 370 may use the same modulation scheme (e.g., a common data signaling modulation scheme), which may include the same quantity of voltage levels as the first modulation scheme.

The system 300 may be configured to communicate the fourth signaling 380 using a fourth modulation scheme, which may be the same as or different than the second modulation scheme (e.g., associated with the second signaling 360). In some examples, such as when carried on a unidirectional error detection channel, the second signaling 360 and the fourth signaling 380 may use different modulation schemes (e.g., different voltage levels, a different quantity of voltage levels, voltage levels spanning a different voltage range). For example, because the memory device 330 is transmitting both the third signaling 370 and the fourth signaling 380, these signals may not be illustrative of signal strength asymmetry. In other words, the third signaling 370 and the fourth signaling 380 may both be relatively strong at the transmitter 340 and relatively weak at the receiver 325. Thus, in some examples, the modulation scheme used for the third signaling 370 and the fourth signaling 380 may span a same voltage range because one is not relatively more susceptible to interference from the other, and the system 300 may not use a particular countermeasure for interference between the third signaling 370 and the fourth signaling 380.

In some examples, using a modulation scheme for the fourth signaling 380 that has a greater quantity of voltage levels than a modulation scheme for the second signaling 360 may be advantageous for supporting read operation error detection using a higher information rate on an error detection channel than write operation error detection (e.g., supporting 4-level EDC for read operations and 2-level EDC for write operations). In some examples, using the same modulation scheme for the second signaling 360 and the fourth signaling 380 may be advantageous (e.g., to reduce complexity). For example, when the second signaling 360 is associated with write operation error detection and the fourth signaling 380 is associated with read operation error detection, using the same modulation scheme for the second signaling 360 and the fourth signaling 380 may avoid complexity related to error detection asymmetry (e.g., different demodulation hardware or operations, different checksum calculations).

Figure 4:
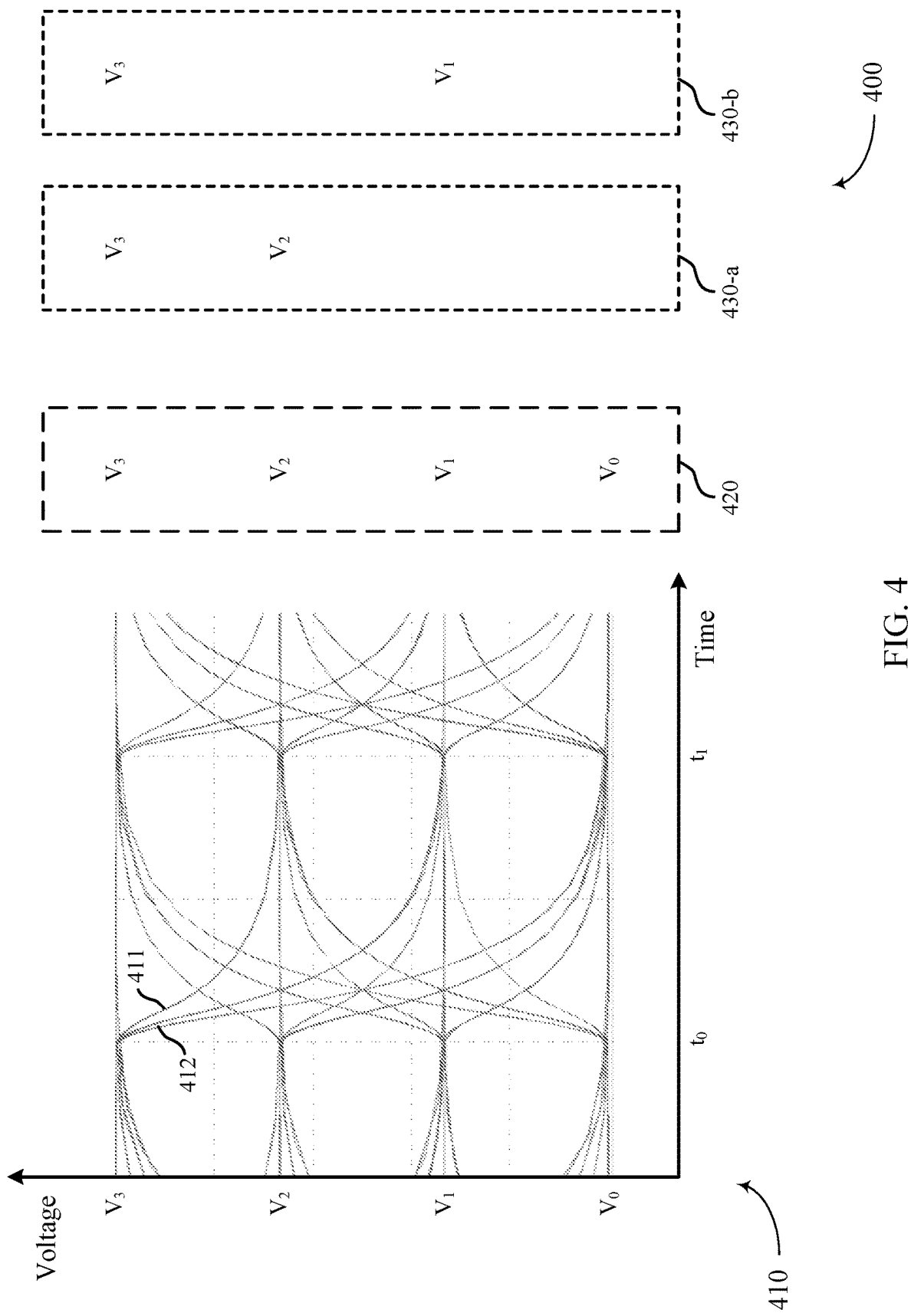
FIG. 4 illustrates an example of modulation schemes that support channel modulation for a memory device in accordance with examples as disclosed herein.

FIG. 4 illustrates an example 400 of modulation schemes that support channel modulation for a memory device in accordance with examples as disclosed herein.

The example 400 includes a signal plot 410, which may illustrate transitions of signals over time according to a PAM4 modulation scheme using four voltage levels (e.g., having voltages of $V_0$, $V_1$, $V_2$, and $V_3$). In one example of the signal plot 410, the voltage levels of the PAM4 modulation scheme may be assigned with voltages of $V_0$=0.50 V, $V_1$=0.67 V, $V_2$=0.83 V, and $V_3$=1.00 V, though other voltage levels or quantities of voltage levels may be assigned in different modulation schemes in accordance with examples as disclosed herein. The signal plot 410 may illustrate modulation schemes where a switching interval from one symbol to another spans a duration of $t_1$-$t_0$. In one example of the signal plot 410, the modulation scheme may support switching signal states (e.g., switching from one symbol to another) in an interval of 100 picoseconds, which may correspond to a modulation rate of 10 GHz. When a signal is switching from one symbol of the modulation scheme to another, a signal path may support a change of voltage from one state to another, or to within some threshold amount of such a change (e.g., according to a time constant behavior of the signal path or components thereof), within a time interval or duration of $t_1$-$t_0$.

In some examples, interference of signals illustrated by the signal plot 410 may be based at least in part on a rate of change associated with the respective signal (e.g., a rate of change in voltage when transitioning from one voltage level to another, a rate of change in charge or current associated with the illustrated change in voltage when transitioning from one voltage level to another). Thus, a steeper slope of a signal of the signal plot 410 may be illustrative of a signal associated with causing greater interference (e.g., a stronger aggressor). In an illustrative example, an interference from a signal transition that spans adjacent voltage levels of the signal plot 410 (e.g., a transition of signal 411, from $V_3$ to $V_2$) may be relatively low when compared to an interference from a signal transition that spans the entire voltage range of the signal plot 410 (e.g., a transition of signal 412, from $V_3$ to $V_0$). Although described with reference to slopes of the signal plot 410 (e.g., a time rate of change of signal voltage), interference of an aggressor may be related to other aspects associated with a range of voltage levels (e.g., a voltage swing) not illustrated by the signal plot 410, such as switching phenomena, signal oscillation, or other sources of interference associated with a signal transitioning from one voltage level to another according to a given modulation scheme.

In various examples, a system 300 including a host device 310 and a memory device 330 may use voltage levels of the signal plot 410 differently in different modulation schemes. For example, a first modulation scheme may use a set of voltage levels 420 (e.g., including $V_0$, $V_1$, $V_2$, and $V_3$) that span a first range of voltage levels (e.g., a span of $V_3$-$V_0$). In some examples, a system may use the set of voltage levels 420 for modulating data signals (e.g., write data, read data) that may be transmitted by a host device 310 and received by a memory device 330, or transmitted by a memory device 330 and received by a host device 310. In some examples, the set of voltage levels 420 may include a quantity of four voltage levels, and may correspond to voltage levels of a PAM4 modulation scheme.

In some examples of a system 300 that uses the set of voltage levels 420 for a first modulation scheme, one or both of the sets of voltage levels 430-a or 430-b may be used for another modulation scheme, which may be based on a static or dynamic configuration. As illustrated, each of the set of voltage levels 430-a and the set of voltage levels 430-b includes voltage levels that span a smaller range of voltages than the set of voltage levels 420. For example, the set of voltage levels 430-a (e.g., including $V_2$ and $V_3$) span a range of voltages (e.g., a span of $V_3$-$V_2$), and the set of voltage levels 430-b (e.g., including $V_1$ and $V_3$) span a range of voltages (e.g., a span of $V_3$-$V_1$). In various examples, the set of voltage levels 430-a or the set of voltage levels 430-b may include a quantity of two voltage levels, and may correspond to voltage levels of a PAM2 modulation scheme.

In some examples, a system 300 that uses the set of voltage levels 420 for a first modulation scheme may use either the set of voltage levels 430-a or the set of voltage levels 430-b for a second modulation scheme. In some examples, such a second modulation scheme may be used for error detection signaling, such as signaling carrying a checksum or other error detection information that is based at least in part on data signaling (e.g., as carried by signaling modulated using the first modulation scheme). In some examples, the set of voltage levels 430-a or the set of voltage levels 430-b may correspond to levels of error detection signaling that is transmitted by a memory device 330 based on write data signaling received by the memory device. In some examples, the set of voltage levels 430-a or the set of voltage levels 430-b may correspond to levels of error detection signaling that is transmitted by a memory device 330 based on read data signaling received by the memory device. In some examples, the set of voltage levels 430-a or the set of voltage levels 430-b may be included in a modulation scheme used to transmit data from a memory device 330 to a host device 310 using a unidirectional channel such as channel configured for error detection and correction information (e.g., an EDC channel).

In the example 400, the set of voltage levels 420 may share at least a voltage level $V_3$ with the set of voltage levels 430-a or the set of voltage levels 430-b. Thus, voltage level $V_3$ may illustrate a voltage level that is shared between a first modulation scheme and a second modulation scheme. In some examples, such a voltage level may be shared based on a termination voltage of the respective system 300. In other words, voltage $V_3$ may correspond to a termination voltage of the respective system 300, which may be associated with zero current through the termination as a result of signals at that voltage level. Such an approach of sharing voltage levels may be beneficial for supporting low power consumption designs. In other examples (e.g., a ground-terminated system), another voltage level may be common between a set of voltages of a first modulation scheme and a set of voltages of a second modulation scheme (e.g., a ground voltage, a virtual ground voltage). In some examples, an intermediate voltage (e.g., $V_0$=0.50 V) may be used as a termination voltage in a system 300, and may correspondingly be a shared voltage level of a first modulation scheme and a second modulation scheme.

The selection of one of the set of voltage levels 430-a or the set of voltage levels 430-b, may be performed in the system 300 in various manners. For example, a configuration that supports the set of voltage levels 430-a or a configuration that supports the set of voltage levels 430-b may be preconfigured in a system based on fixed hardware design (e.g., special-purpose hardware), selectable parameters (e.g., as stored in non-volatile storage of the memory device 330 or the host device 310, a mode register of the memory device or the host device 310, as stored in a fuse or other one-time programmable storage of the memory device 330 or the host device 310), or various combinations thereof. A system 300 may be configured with a second modulation scheme that includes the set of voltage levels 430-a, for example, to support relatively low interference from an aggressor or relatively low cross-talk, because an interference associated with the set of voltage levels 430-a (e.g., based at least in part on a relatively smaller time-derivative of voltage associated with the span of ($V_3$-$V_2$)) may be relatively lower than an interference associated with the set of voltage levels 430-b (e.g., based at least in part on a relatively greater time-derivative of voltage associated with the span of ($V_3$-$V_1$)). A system 300 may be configured with a second modulation scheme that includes the set of voltage levels 430-b, for example, to support relatively improved decoding or resolving, because it may be easier to distinguish between symbols conveyed with voltages of $V_3$ or $V_1$ (e.g., based on a relatively wider "eye height" or resolving window associated with the span of ($V_3$-$V_1$)) than to distinguish between symbols conveyed with voltages of $V_3$ or $V_2$ (e.g., based on a relatively narrower "eye height" or resolving window associated with the span of ($V_3$-$V_2$)).

In some examples, the selection of one of the set of voltage levels 430-a or the set of voltage levels 430-b may be dynamically configured. For example, a host device 310, a memory device 330, or both may perform various operations, detections, or determinations to dynamically configure a modulation scheme to use the set of voltage levels 430-a or the set of voltage levels 430-b. In some examples, a selection of one of the set of voltage levels 430-a or the set of voltage levels 430-b may be performed based at least on a communication or exchange of signaling between a host device 310 and a memory device 330. For example, a host device 310 and the memory device 330 may perform a training sequence that includes a set of write operations and a set of error detection operations, and the set of voltage levels 430-a or the set of voltage levels 430-b may be selected or configured based on a result of the training sequence.

In one example, a system 300 may begin with the set of voltage levels 430-b for a modulation scheme (e.g., for error detection signaling), and if too much interference or cross-talk is experienced (e.g., determining errors with data channel signaling being above a threshold), the system 300 may instead be configured to use the set of voltage levels 430-a. In another example, a system 300 may begin with the set of voltage levels 430-a for a modulation scheme (e.g., for error detection signaling), and if too many errors associated with resolving signaling using the modulation scheme is experienced (e.g., determining errors with resolving error detection signaling being above a threshold), the system 300 may instead be configured to use the set of voltage levels 430-*b*.

In some examples, a system 300 may use the set of voltage levels 420 for both write data signaling and read data signaling, which may be an example of a modulation scheme or schemes that use a same set of voltage levels for both directions of signaling (e.g., on a bidirectional channel 115). In various examples, a system 300 that uses the set of voltage levels 420 for both write data signaling and read data signaling may use either a same set of voltage levels (e.g., a same modulation scheme) for associated error detection signaling or a different set of voltage levels (e.g., a different modulation scheme) for associated error detection signaling. In one example, a system 300 may use the set of voltage levels 430-*a* for both write data error detection signaling and read data error detection signaling (e.g., in a symmetric error detection configuration). In another example, a system 300 may use the set of voltage levels 430-*a* for write data error detection signaling and the set of voltage levels 420 for read date error detection signaling (e.g., in an asymmetric error detection configuration).

Although example 400 is illustrated in the context of configuring (e.g., by design or by dynamic determination) particular voltage levels for a modulation scheme (e.g., according to a set of voltage levels 420 and either the set of voltage levels 430-*a* or the set of voltage levels 430-*b*), a system 300 may additionally or alternatively be configured with a particular quantity of levels for a second modulation scheme (e.g., configuring some quantity of voltage levels other than four levels or two levels for a modulation scheme). Moreover, in some examples, a system 300 may be configured with voltage levels that are not necessarily a subset of another set of voltage levels. For example, compared with a first modulation scheme that includes the set of voltage levels 420 (e.g., including $V_0$, $V_1$, $V_2$, and $V_3$), a second modulation scheme may include a set of voltage levels that includes $V_3$ (e.g., a termination voltage) and another voltage, not shown, that is between $V_1$ and $V_2$, which may be a compromise of considerations described with reference to the set of voltage levels 430-*a* and the set of voltage levels 430-*b*. Moreover, although described in the context of two alternative sets of voltage levels for a modulation scheme (e.g., the set of voltage levels 430-*a* and the set of voltage levels 430-*b*, sets of voltage levels for a second modulation scheme), a configuration of voltage levels for a modulation scheme may be determined, identified, or otherwise selected from two alternatives or more than two alternatives. Indeed, the described sets of voltage levels are examples of configurations that may support the described techniques for channel modulation for a memory device.

Figure 5:
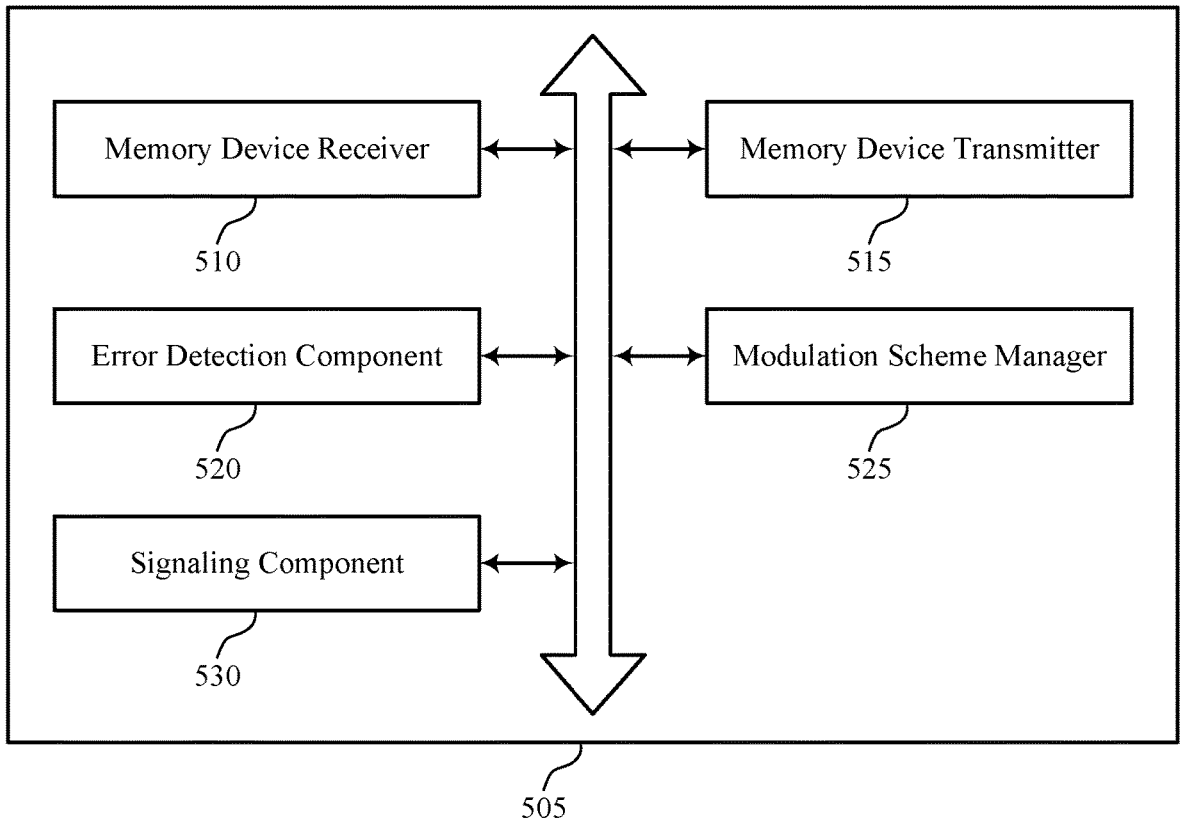
FIG. 5 shows a block diagram of a memory device that supports channel modulation for a memory device in accordance with examples as disclosed herein.

FIG. 5 shows a block diagram 500 of a memory device 505 that supports channel modulation for a memory device in accordance with examples as disclosed herein. The memory device 505 may be an example of aspects of a memory device as described with reference to FIGS. 1 through 4. The memory device 505 may include a memory device receiver 510, a memory device transmitter 515, an error detection component 520, a modulation scheme manager 525, and a signaling component 530. Each of these modules may communicate, directly or indirectly, with one another (e.g., via one or more buses).

The memory device receiver 510 may receive, over a first channel, a first signal that is modulated using a first modulation scheme that includes a first quantity of voltage levels spanning a first range of voltages. In some examples, the memory device receiver 510 may include a demodulator configured to demodulate received signals according to one or more modulation schemes. In some cases, the first channel is a bidirectional channel. In some cases, the first channel is configured for data. In some cases, the first signal is associated with a write operation of the memory device. In some cases, the first quantity of voltage levels includes three or more voltage levels.

The memory device transmitter 515 may transmit, over a second channel, (e.g., over an error detection channel or other channel) a second signal based on receiving the first signal, the second signal modulated using a second modulation scheme that includes a second quantity of voltage levels spanning a second range of voltages smaller than the first range of voltages. In some examples, the memory device receiver 510 may include a modulator configured to modulate signals for transmission according to one or more modulation schemes. In some cases, the second channel is configured for error detection and correction information. In some cases, the second quantity of voltage levels is less than the first quantity of voltage levels. In some cases, the second quantity of voltage levels includes two voltage levels.

In some examples, the memory device transmitter 515 may transmit, over the first channel, a third signal that is modulated using the first modulation scheme.

In some examples, the memory device transmitter 515 may transmit (e.g., over the second channel, over the error detection channel or the other channel) a fourth signal including error detection information associated with the third signal, the fourth signal modulated using a third modulation scheme that includes a third quantity of voltage levels. In some cases, the third quantity of voltage levels spans the first range of voltages. In some cases, the third quantity is different than the second quantity. In some cases, the third quantity is equal to the first quantity.

The error detection component 520 may determine error detection information associated with the first signal, where the second signal includes the error detection information. In some cases, the error detection information includes a CRC-checksum based on the first signal.

In some examples, the modulation scheme manager 525 may determine the second quantity of voltage levels based on reading a non-volatile storage component of the memory device, and transmitting the second signal may be based on determining the second quantity of voltage levels. In some examples, the modulation scheme manager 525 may determine one or more voltage levels of the second modulation scheme based on reading a non-volatile storage component of the memory device.

In some examples, the signaling component 530 may communicate signaling with a host device. In some examples, the modulation scheme manager 525 may communicate signaling with a host device. In some examples, the modulation scheme manager 525 may determine the second quantity of voltage levels based on the signaling. In some examples, the modulation scheme manager 525 may determine one or more voltage levels of the second modulation scheme based on the signaling. In some cases, the communicating occurs in response to initializing the memory device.

Figure 6:
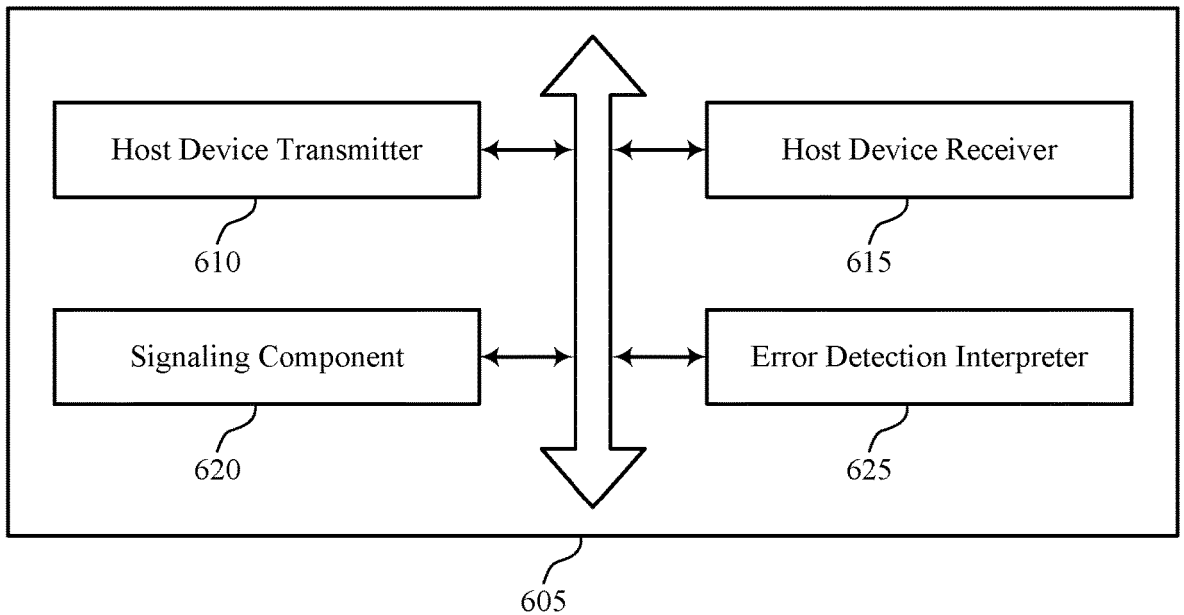
FIG. 6 shows a block diagram of a host device that supports channel modulation for a memory device in accordance with examples as disclosed herein.

FIG. 6 shows a block diagram 600 of a host device 605 that supports channel modulation for a memory device in accordance with examples as disclosed herein. The host device 605 may be an example of aspects of a host device as described with reference to FIGS. 1 through 4. The host device 605 may include a host device transmitter 610, a host device receiver 615, a signaling component 620, and an error detection interpreter 625. Each of these modules may communicate, directly or indirectly, with one another (e.g., via one or more buses).

The host device transmitter 610 may transmit, to a memory device over a first channel, a first signal that is modulated using a first modulation scheme that includes a first quantity of voltage levels that span a first range of voltages. In some examples, the host device transmitter 610 may include a modulator configured to modulate signals for transmission according to one or more modulation schemes. In some cases, the first channel is a bidirectional channel. In some cases, the first channel is configured for data. In some cases, the first signal is associated with a write operation of the memory device. In some cases, the first quantity of voltage levels includes three or more voltage levels.

The host device receiver 615 may receive, from the memory device over a second channel (e.g., over an error detection channel or another channel), a second signal based on the first signal, the second signal modulated using a second modulation scheme that includes a second quantity of voltage levels that span a second range of voltages smaller than the first range of voltages. In some examples, the host device receiver 615 may include a demodulator configured to demodulate received signals according to one or more modulation schemes. In some cases, the second quantity of voltage levels is less than the first quantity of voltage levels. In some cases, the second quantity of voltage levels includes two voltage levels.

In some examples, the host device receiver 615 may receive, from the memory device over the first channel, a third signal that is modulated using the first modulation scheme that includes the first quantity of voltage levels. In some examples, the host device receiver 615 may receive, from the memory device (e.g., over the second channel, over the error detection channel or the other channel), a fourth signal, including error detection information associated with the third signal, using a third modulation scheme that includes a third quantity of voltage levels. In some cases, the third quantity is different than the second quantity. In some cases, the third quantity is equal to the first quantity. In some cases, the third quantity of voltage levels spans the first range of voltages.

The signaling component 620 may communicate signaling with the memory device, where the second quantity of voltage levels is determined based on the signaling. In some examples, the signaling component 620 may communicate signaling with the memory device, where one or more voltage levels of the second modulation scheme is determined based on the signaling. In some cases, the communicating is based on an initialization of the memory device.

In some cases, the second signal includes error detection information associated with the first signal, and the error detection interpreter 625 may interpret the error detection information. In some cases, the error detection information includes a CRC-checksum based on the first signal.

Figure 7:
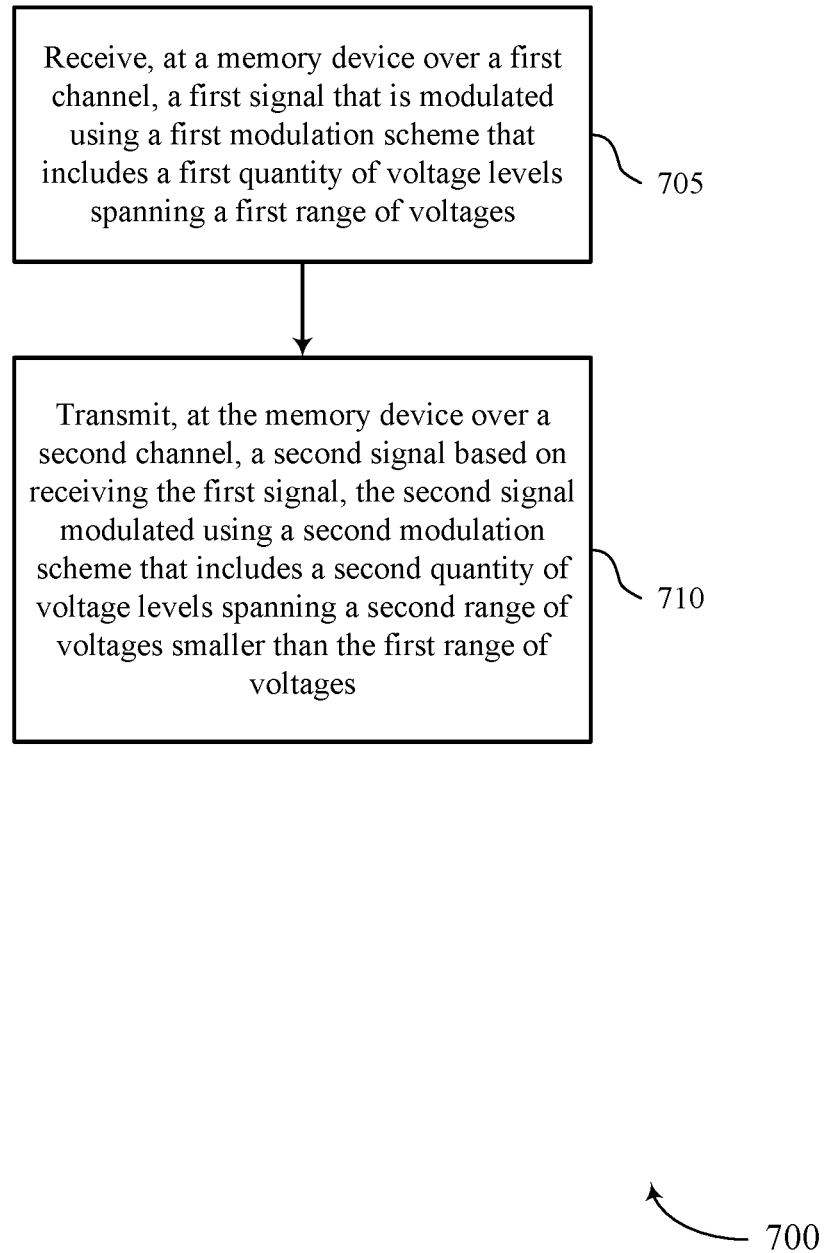
FIGS. 7 and 8 show flowcharts illustrating a method or methods that support channel modulation for a memory device in accordance with examples as disclosed herein.

FIG. 7 shows a flowchart illustrating a method or methods 700 that support channel modulation for a memory device in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the memory device to perform the described functions. Additionally or alternatively, a memory device may perform aspects of the described functions using circuitry or special-purpose hardware.

At 705, the memory device may receive, over a first channel, a first signal that is modulated using a first modulation scheme that includes a first quantity of voltage levels spanning a first range of voltages. The operations of 705 may be performed according to the methods described herein. In some examples, aspects of the operations of 705 may be performed by a memory device receiver as described with reference to FIG. 5.

At 710, the memory device may transmit, over a second channel (e.g., over an error detection channel or another channel), a second signal based on receiving the first signal, the second signal modulated using a second modulation scheme that includes a second quantity of voltage levels spanning a second range of voltages smaller than the first range of voltages. The operations of 710 may be performed according to the methods described herein. In some examples, aspects of the operations of 710 may be performed by a memory device transmitter as described with reference to FIG. 5.

In some examples, an apparatus as described herein may perform a method or methods, such as the method 700. The apparatus may include features, circuitry, means, or instructions (e.g., a non-transitory computer-readable medium storing instructions executable by a processor) for receiving, at a memory device over a first channel, a first signal that is modulated using a first modulation scheme that includes a first quantity of voltage levels spanning a first range of voltages, and transmitting, at the memory device over a second channel (e.g., over an error detection channel or another channel), a second signal based on receiving the first signal, the second signal modulated using a second modulation scheme that includes a second quantity of voltage levels spanning a second range of voltages smaller than the first range of voltages.

In some examples of the method 700 and the apparatus described herein, the first channel may be a bidirectional channel. In some examples of the method 700 and the apparatus described herein, the first channel may be configured for data. In some examples of the method 700 and the apparatus described herein, the second quantity of voltage levels may be less than the first quantity of voltage levels.

Some examples of the method 700 and the apparatus described herein may include operations, features, circuitry, means, or instructions for determining error detection information associated with the first signal, where the second signal includes the error detection information. In some examples, the error detection information includes a CRC-checksum based on the first signal. In some examples of the method 700 and the apparatus described herein, the second channel may be configured for error detection and correction information.

Some examples of the method 700 and the apparatus described herein may include operations, features, circuitry, means, or instructions for determining the second quantity of voltage levels based on reading a non-volatile storage component of the memory device. Some examples of the method 700 and the apparatus described herein may include operations, features, circuitry, means, or instructions for determining one or more voltage levels of the second modulation scheme based on reading a non-volatile storage component of the memory device. In some examples, transmitting the second signal may be based on determining the second quantity of voltage levels.

Some examples of the method 700 and the apparatus described herein may include operations, features, circuitry, means, or instructions for communicating signaling with a host device, and determining the second quantity of voltage levels based on the signaling. Some examples of the method 700 and the apparatus described herein may include operations, features, circuitry, means, or instructions for communicating signaling with a host device, and determining one or more voltage levels of the second modulation scheme based on the signaling. In some examples of the method 700 and the apparatus described herein, the communicating occurs in response to initializing the memory device.

In some examples of the method 700 and the apparatus described herein, the first signal may be associated with a write operation of the memory device.

In some examples of the method 700 and the apparatus described herein, the first quantity of voltage levels includes three or more voltage levels, and the second quantity of voltage levels includes two voltage levels.

Some examples of the method 700 and the apparatus described herein may include operations, features, circuitry, means, or instructions for transmitting, at the memory device over the first channel, a third signal that may be modulated using the first modulation scheme, and transmitting, at the memory device (e.g., over the second channel, over the error detection channel or the other channel), a fourth signal including error detection information associated with the third signal, the fourth signal modulated using a third modulation scheme that includes a third quantity of voltage levels.

In some examples of the method 700 and the apparatus described herein, the third quantity of voltage levels spans the first range of voltages. In some examples of the method 700 and the apparatus described herein, the third quantity may be different than the second quantity. In some examples of the method 700 and the apparatus described herein, the third quantity may be equal to the first quantity.

Figure 8:
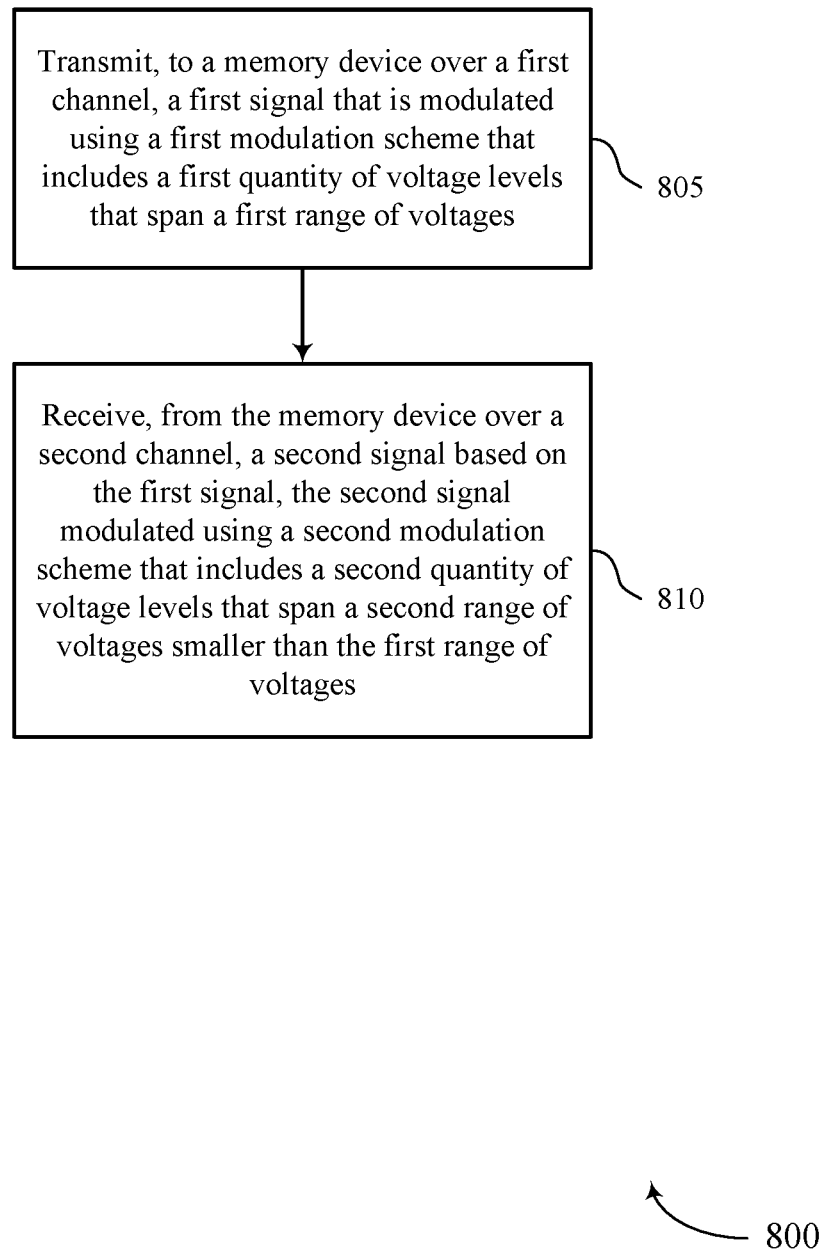

FIG. 8 shows a flowchart illustrating a method or methods 800 that support channel modulation for a memory device in accordance with examples as disclosed herein. The operations of method 800 may be implemented by a host device or its components as described herein. For example, the operations of method 800 may be performed by a host device as described with reference to FIGS. 1 through 4 and 6. In some examples, a host device may execute a set of instructions to control the functional elements of the host device to perform the described functions. Additionally or alternatively, a host device may perform aspects of the described functions using circuitry or special-purpose hardware.

At 805, the host device may transmit, to a memory device over a first channel, a first signal that is modulated using a first modulation scheme that includes a first quantity of voltage levels that span a first range of voltages. The operations of 805 may be performed according to the methods described herein. In some examples, aspects of the operations of 805 may be performed by a host device transmitter as described with reference to FIG. 6.

At 810, the host device may receive, from the memory device over a second channel (e.g., over an error detection channel or other channel), a second signal based on the first signal, the second signal modulated using a second modulation scheme that includes a second quantity of voltage levels that span a second range of voltages smaller than the first range of voltages. The operations of 810 may be performed according to the methods described herein. In some examples, aspects of the operations of 810 may be performed by a host device receiver as described with reference to FIG. 6.

In some examples, an apparatus as described herein may perform a method or methods, such as the method 800. The apparatus may include features, circuitry, means, or instructions (e.g., a non-transitory computer-readable medium storing instructions executable by a processor) for transmitting, to a memory device over a first channel, a first signal that is modulated using a first modulation scheme that includes a first quantity of voltage levels that span a first range of voltages, and receiving, from the memory device over a second channel (e.g., over an error detection channel or other channel), a second signal based on the first signal, the second signal modulated using a second modulation scheme that includes a second quantity of voltage levels that span a second range of voltages smaller than the first range of voltages.

Some examples of the method 800 and the apparatus described herein may include operations, features, circuitry, means, or instructions for communicating signaling with the memory device, and the second quantity of voltage levels may be determined based on the signaling. Some examples of the method 800 and the apparatus described herein may include operations, features, circuitry, means, or instructions for communicating signaling with the memory device, and one or more voltage levels of the second modulation scheme may be determined based on the signaling. In some examples of the method 800 and the apparatus described herein, the communicating may be based on an initialization of the memory device.

Some examples of the method 800 and the apparatus described herein may include operations, features, circuitry, means, or instructions for receiving, from the memory device over the first channel, a third signal that may be modulated using the first modulation scheme that includes the first quantity of voltage levels, and receiving, from the memory device (e.g., over the second channel, over the error detection channel or the other channel), a fourth signal, including error detection information associated with the third signal, using a third modulation scheme that includes a third quantity of voltage levels.

In some examples of the method 800 and the apparatus described herein, the third quantity of voltage levels spans the first range of voltages. In some examples of the method 800 and the apparatus described herein, the third quantity may be different than the second quantity. In some examples of the method 800 and the apparatus described herein, the third quantity may be equal to the first quantity.

In some examples of the method 800 and the apparatus described herein, the second quantity of voltage levels may be less than the first quantity of voltage levels. In some examples of the method 800 and the apparatus described herein, the first quantity of voltage levels includes three or more voltage levels, and the second quantity of voltage levels includes two voltage levels.

In some examples of the method 800 and the apparatus described herein, the first signal may be associated with a write operation of the memory device. In some examples of the method 800 and the apparatus described herein, the first channel may be a bidirectional channel. In some examples of the method 800 and the apparatus described herein, the first channel may be configured for data.

In some examples of the method 800 and the apparatus described herein, the second signal includes error detection information associated with the first signal. In some examples, the error detection information includes a CRC-checksum based on the first signal. In some examples of the method 800 and the apparatus described herein, the second channel may be configured for error detection and correction information.

An apparatus is described. The apparatus may include an array of memory cells configured to store information, a receiver coupled with the array of memory cells and configured to receive, over a first channel, a first signal that is modulated using a first modulation scheme that includes a first quantity of voltage levels that span a first range of voltages, and a transmitter coupled with the array of memory cells and configured to transmit, over a second channel, a second signal based at least in part on receiving the first signal, the second signal modulated using a second modulation scheme that includes a second quantity of voltage levels that span a second range of voltages smaller than the first range of voltages.

Some examples of the apparatus may include a non-volatile storage component configured to store a modulation parameter that indicates the second quantity of voltage levels associated with the second modulation scheme.

Some examples of the apparatus may include a non-volatile storage component configured to store a modulation parameter that indicates the second range of voltages associated with the second modulation scheme.

Some examples of the apparatus may include a controller configured to determine error detection information associated with the first signal based at least in part on the second signal.

Some examples of the apparatus may include a controller configured to determine the second quantity of voltage levels based at least in part on exchanging signaling with a host device.

Some examples of the apparatus may include a controller configured to determine one or more voltage levels of the second modulation scheme based at least in part on exchanging signaling with a host device.

In some examples of the apparatus, the first quantity of voltage levels may include three or more voltage levels, and the second quantity of voltage levels may include two voltage levels.

In some examples of the apparatus, the first channel may be configured for data and the second channel may be configured for error detection and correction information.

Another apparatus is described. The apparatus may include a transmitter of a host device configured to transmit, to a memory device over a first channel, a first signal that is modulated using a first modulation scheme that includes a first quantity of voltage levels that span a first range of voltages, and a receiver of the host device configured to receive, from the memory device over a second channel, a second signal based at least in part on the first signal, the second signal modulated using a second modulation scheme that includes a second quantity of voltage levels that span a second range of voltages smaller than the first range of voltages.

Some examples of the apparatus may include a controller of the host device configured to transmit one or more signals to the memory device to indicate the second quantity of voltage levels of the second modulation scheme.

Some examples of the apparatus may include a controller of the host device configured to transmit one or more signals to the memory device to indicate one or more voltage levels of the second modulation scheme.

In some examples of the apparatus, the first quantity of voltage levels may include three or more voltage levels, and the second quantity of voltage levels may include two voltage levels.

In some examples of the apparatus, the second signal includes error detection information associated with the first signal.

In some examples of the apparatus, the first channel may be configured for data and the second channel may be configured for error detection and correction information.

A system is described. The system may include a memory device and a host device coupled with the memory device. The system may be configured to communicate, from the host device to the memory device over a first channel, a first signal that is modulated using a first modulation scheme that includes a first quantity of voltage levels that span a first range of voltages, and communicate, from the memory device to the host device over a second channel, a second signal that is based at least in part on the first signal, the second signal modulated using a second modulation scheme that includes a second quantity of voltage levels that span a second range of voltages smaller than the first range of voltages.

In some examples of the system, the first quantity of voltage levels may include three or more voltage levels, and the second quantity of voltage levels may include two voltage levels.

In some examples of the system, the first channel may be configured for data and the second channel may be configured for error detection and correction information.

It should be noted that the described methods include possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

The term "layer" used herein refers to a stratum or sheet of a geometrical structure. each layer may have three dimensions (e.g., height, width, and depth) and may cover at least a portion of a surface. For example, a layer may be a three-dimensional structure where two dimensions are greater than a third, e.g., a thin-film. Layers may include different elements, components, and/or materials. In some cases, one layer may be composed of two or more sublayers. In some of the appended figures, two dimensions of a three-dimensional layer are depicted for purposes of illustration. Those skilled in the art will, however, recognize that the layers are three-dimensional in nature.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some cases, may be employed as an electrical contact to a memory cell or other component of a memory array. An electrode may include a trace, wire, conductive line, conductive layer, or other features that provides a conductive path between elements or components of memory array.

As used herein, the term "shorting" refers to a relationship between components in which a conductive path is established between the components via the activation of a single intermediary component between the two components in question. For example, a first component shorted to a second component may exchange signals with the second component when a switch between the two components is closed. Thus, shorting may be a dynamic operation that enables the flow of charge between components (or lines) that are in electronic communication.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, the described functions can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. With the guidance of the present disclosure, various modifications to the described techniques will be apparent to those skilled in the art, and the principles defined herein may be applied to other variations or equivalents without departing from the scope of the disclosure. Thus, the disclosure is not limited to the examples and designs described herein, but is to be accorded the broadest scope consistent with the principles and novel features disclosed herein.

What is claimed is:

1. A method, comprising:
transmitting first signaling, by a first device over a first channel between the first device and a second device, the first signaling modulated using a first modulation scheme that includes a first quantity of voltage levels spanning a first range of voltages; and
transmitting second signaling, by the first device over a second channel between the first device and the second device, the second signaling modulated using a second modulation scheme that includes a second quantity of voltage levels spanning a second range of voltages smaller than the first range of voltages.

2. The method of claim 1, wherein:
the first channel is configured for bidirectional signaling between the first device and the second device; and
the second channel is configured for unidirectional signaling between the first device and the second device.

3. The method of claim 1, wherein:
the first signaling comprises data signaling from the first device; and
the second signaling comprises error detection and correction information signaling associated with the data signaling from the first device.

4. The method of claim 1, further comprising:
determining read data based at least in part on performing a read operation on an array of memory cells of the first device, wherein transmitting the first signaling comprises transmitting the read data; and
determining read operation error detection information based at least in part on performing the read operation, wherein transmitting the second signaling comprises transmitting the read operation error detection information.

5. The method of claim 1, further comprising:
determining the second quantity of voltage levels based at least in part on reading a non-volatile storage component of the first device, wherein transmitting the second signaling is based at least in part on determining the second quantity of voltage levels.

6. The method of claim 1, further comprising:
determining one or more voltage levels of the second modulation scheme based at least in part on reading a non-volatile storage component of the first device, wherein transmitting the second signaling is based at least in part on determining the one or more voltage levels.

7. The method of claim 1, further comprising:
communicating signaling with the second device; and
determining the second quantity of voltage levels, or one or more voltage levels of the second modulation scheme, or both based at least in part on the signaling.

8. The method of claim 1, further comprising:
receiving third signaling, by the first device over the first channel, the third signaling modulated using the first modulation scheme.

9. The method of claim 8, wherein:
the third signaling comprises data signaling from the second device; and
the second signaling comprises error detection and correction information signaling associated with the data signaling from the second device.

10. The method of claim 1, wherein the second quantity of voltage levels is less than the first quantity of voltage levels.

11. A method, comprising:
receiving first signaling, by a first device over a first channel between the first device and a second device, the first signaling modulated using a first modulation scheme that includes a first quantity of voltage levels spanning a first range of voltages; and
receiving second signaling, by the first device over a second channel between the first device and the second device, the second signaling modulated using a second modulation scheme that includes a second quantity of voltage levels spanning a second range of voltages smaller than the first range of voltages.

12. The method of claim 11, wherein:
the first channel is configured for bidirectional signaling between the first device and the second device; and
the second channel is configured for unidirectional signaling between the first device and the second device.

13. The method of claim 11, wherein:
the first signaling comprises data signaling from the first device; and
the second signaling comprises error detection and correction information signaling associated with the data signaling from the first device.

14. The method of claim 11, further comprising:
communicating signaling with the second device, wherein the second quantity of voltage levels, or one or more voltage levels of the second modulation scheme, or both are determined based at least in part on the signaling.

15. The method of claim 11, further comprising:
transmitting third signaling, by the first device over the first channel, the third signaling modulated using the first modulation scheme.

16. The method of claim 15, further comprising:
the third signaling comprises data signaling from the first device; and
the second signaling comprises error detection and correction information signaling associated with the data signaling from the first device.

17. An apparatus, comprising:
a receiver configured to receive first signaling over a first channel between the apparatus and a second apparatus, the first signaling modulated using a first modulation scheme that includes a first quantity of voltage levels spanning a first range of voltages; and
a transmitter configured to transmit second signaling over a second channel between the apparatus and the second apparatus, the second signaling modulated using a second modulation scheme that includes a second quantity of voltage levels spanning a second range of voltages smaller than the first range of voltages.

18. The apparatus of claim 17, wherein:
the first signaling comprises data signaling from the second apparatus; and
the second signaling comprises error detection and correction information signaling associated with the data signaling from the second apparatus.

19. The apparatus of claim 17, further comprising:
a transmitter configured to transmit third signaling over the first channel, the third signaling modulated using the first modulation scheme.

20. The apparatus of claim 19, wherein:
the third signaling comprises data signaling from the apparatus; and
the second signaling comprises error detection and correction information signaling associated with the data signaling from the apparatus.

* * * * *